United States Patent
Qin et al.

(10) Patent No.: US 7,404,022 B2
(45) Date of Patent: Jul. 22, 2008

(54) METHOD AND SYSTEM FOR TRANSMISSION AND CONTROL OF DATA STORED IN A USB MASTER TO AND FOR UTILIZATION BY A USB SLAVE

(75) Inventors: Zhishang Qin, Changzhou (CN); Jiawei Jiang, Changzhou (CN)

(73) Assignee: Shinco Electronic Group Co., Ltd., Jiangsu Province (CN)

( * ) Notice: Subject to any disclaimer, the term of this patent is extended or adjusted under 35 U.S.C. 154(b) by 61 days.

(21) Appl. No.: 11/236,383

(22) Filed: Sep. 27, 2005

(65) Prior Publication Data

US 2006/0069841 A1    Mar. 30, 2006

(30) Foreign Application Priority Data

Sep. 27, 2004    (CN) .................. 2004 1 0064816

(51) Int. Cl.
*G06F 13/18*    (2006.01)
*G06F 13/20*    (2006.01)

(52) U.S. Cl. ............... 710/110; 710/313; 710/314; 710/74; 710/29

(58) Field of Classification Search ......... 710/300–306, 710/309–315, 62–64, 72–74, 10–16, 29, 710/31–32, 110
See application file for complete search history.

(56) References Cited

U.S. PATENT DOCUMENTS

| 5,861,841 | A  | * | 1/1999 | Gildea et al. | 342/357.12 |
| 6,002,982 | A  | * | 12/1999 | Fry | 701/213 |
| 6,148,354 | A  | * | 11/2000 | Ban et al. | 710/301 |
| 6,593,878 | B2 | * | 7/2003 | Fall | 342/357.1 |
| 6,654,817 | B1 | * | 11/2003 | Huang | 710/1 |
| 6,880,024 | B2 | * | 4/2005 | Chen et al. | 710/62 |
| 2002/0038394 | A1 | * | 3/2002 | Liang et al. | 710/62 |
| 2005/0223145 | A1 | * | 10/2005 | Lin et al. | 710/62 |

* cited by examiner

*Primary Examiner*—Raymond N Phan
(74) *Attorney, Agent, or Firm*—Kaplan Gilman Gibson & Dernier LLP

(57) ABSTRACT

The present invention concerns a method and a system for data transmission and control based on Universal Serial Bus (USB). The system comprises a USB Master device and a USB Slave device. The USB Master device comprises a USB Master processor and a Data Storage connected to the USB Master processor. The Slave device comprises a USB Slave processor and a Data Consumer connected to the USB Slave processor. The USB Master processor is coupled with the USB Slave processor via a USB cable. The USB Master processor accepts requests from the USB Slave processor and reads data in the Data Storage connected to it, and then the data is sent to the USB Slave processor via the USB cable, and the USB Slave processor processes the data and transfers them to the Data Consumer for use.

7 Claims, 5 Drawing Sheets

US 7,404,022 B2

METHOD AND SYSTEM FOR TRANSMISSION AND CONTROL OF DATA STORED IN A USB MASTER TO AND FOR UTILIZATION BY A USB SLAVE

BACKGROUND OF THE INVENTION

The present invention concerns a method and a system for data transmission and control. More particularly, it concerns a method and a system for data transmission and control based on Universal Serial Bus (USB).

USB, abbreviated from Universal Serial Bus, is a free data transmission specification which transfers data in USB format and is brought forward together by Compaq, DEC, IBM, Intel, Microsoft, NEC, Northern Telecom and etc to simplify the interconnection between PC and peripheral devices. In order to transfer data between devices with CPU therein under the USB format, some software in accordance with USB specification should be installed into the devices which should be coupled with each other via a USB cable to be an USB system. Generally speaking, a USB system comprises three parts: USB host (called USB Master device hereafter in this description), USB device (called USB Slave device or USB function hereafter in this description) and USB interconnection between USB host and USB devices (simply called USB cable or USB connection in this description). USB Master device is coupled with USB Slave device via USB cable. Some software is installed into USB Master device while there is some device configuration information in USB Slave device. After turned on, USB Master device provides power to USB Slave device via a power line in the USB cable. A pulse signal, which is produced by a pull-up resistor, returns to USB Master device through USB cable to inform the existence of USB Slave device to USB Master device and then USB Master device assigns an unique address to USB Slave device. The address is marked by an address register in USB Master device to make sure that corresponding data packets from USB Master device will not be transferred to other USB Slave devices. Meanwhile, a message channel called "ENDPOINT 0" is created between USB Master processor and USB Slave device at first, and then USB Master processor starts to read the device configuration tag word stored in the ROM of USB Slave device through the ENDPOINT 0. The device configuration tag word comprises the device configuration information of USB Slave device. Based on the device configuration tag word, USB Master processor assigns a configuration value to USB Slave device, and then USB Slave device becomes configured. Thus a communication relation is set up between USB Master processor and USB Slave device. The process of setting up a communication relation between the USB Master processor and the Slave device is called "USB Enumeration". In any USB system, there is only one USB Master device, while USB Slave device can be in number from 1 to 127. Under circumstance of lots of Slave devices, USB Master device and USB Slave devices can be coupled with each other by USB hubs and USB cables.

It should be noted that the word "couple" mentioned above should not be limited to the meaning of coupling through a direct connection of a cable. For example, "UNIT A couples in UNIT B" could not be limited to a coupling in which the output of the UNIT A connects directly to the input of the UNIT B. What it means is that there is a channel between the UNIT A and the UNIT B, and the channel may comprise other devices or other parts.

FIG. 1 is a circuit frame diagram of a conventional USB system. This USB system comprises a USB Master device 131 and a Slave device 132 coupled with each other by a USB cable 121 wherein a communication relation was established. In FIG. 1, USB Master device 131 comprises a USB Master processor 111 and a Data Consumer 114. USB Slave device 132 comprises a USB Slave processor 112 and a Data Storage 115. USB Master processor 111 could be coupled with other Slave devices via USB cable 124. When the system works, USB Master device 131 sends a command to USB Slave processor 112 through USB Master processor 111. And USB Slave processor 112 reads from or writes to the storage system in response to the command, and then transfers the resulting data to USB Master processor 111 which processes the data and then transfers it to the Data Consumer 114 for use.

FIG. 2 is a circuit frame diagram of another conventional USB system. USB Master device 331 of the USB system is a DVD player with a USB Master processor 311 and its Data Consumer 314 comprises a video/audio processor for video/audio decoding. USB Slave device 332 is a static Card Reader comprising a USB Slave processor 312 which could control Data Storage 315. Data Storage 315 could be selected from many storage media such as Smart Media, Memory Stick, Compact Flash, SD card, etc. DVD player 331 couples with Card Reader 332 via USB cable 321. DVD player 331 may also establish communication relations with other USB Slave processor devices via the USB cable 324.

In the USB system, the data transmission between USB Master device and USB Slave device is a synchronous transmission which speed is several fold decuple to the speed of the normal serial port transmission (RS232). The USB Specification supports "Hot Plug-unplug" with regard to connection between USB Master device and USB Slave device, and when coupled with USB Master device, USB Slave device can obtain power from USB Master device directly. The USB data transmission in the full speed can reach the speed of 12 Mb/s, which is hundredfold to the speed of RS232 transmission. According to USB specification 2.0, the speed of USB data transmission can reach to 480 Mb/s. As USB specification 2.0 comes into application in state, a variety of storage devices with USB interface have been developed too fast and too many to see. USB hard disk with the speed of 480 Mb/s according to USB specification 2.0 makes a breakthrough in speed bottleneck and become focus of eyes as Portable Disc-carving machine and flash memory become acceptable for the improvement of speed. That makes real-time transmission of high-discriminating, color-real large figure possible. But the limitation for conventional USB systems is that data can only be transferred from the storage of USB Slave device to the USB Master processor to be processed and then provided to the Data Consumer of the USB Master device for use. This function is comparatively simple.

SUMMARY OF THE INVENTION

The purpose of the present invention is to provide a system for data transmission and control based on Universal Serial Bus (USB) and the method thereof. The said system makes it possible that data in the Data Storage of USB Master device be transferred to the Slave device and then the Data Consumer in USB Slave device utilizes the data.

To attain the purpose of the system for data transmission and control based on USB, this system comprises a USB Master device and a USB Slave device, the USB Master device comprising a USB Master processor; the USB Slave device comprising a USB Slave processor; the USB Master processor coupled with the USB Slave processor via a USB cable; it characterizes the system in structure in that there is a Data Storage connected to the USB Master processor in the USB Master device and there is a Data Consumer connected to the USB Slave processor in the Slave device, and that there is a communication relation between the USB Master processor and the USB Slave processor through which the USB Slave processor could get and process the data from the Data Storage via the USB Master processor.

To attain the purpose of the method for data transmission and control based on USB: this system of the method comprises a USB Master device and a Slave device, the USB Master device comprising a USB Master processor and a Data Storage connected to the USB Master processor, the USB Slave device comprising a USB Slave processor and a Data Consumer connected to the USB Slave processor, the USB Master processor coupled with the USB Slave processor via a USB cable; the method comprises the following basic procedures: the USB Master processor enquires of the USB Slave processor whether there is any request of service; if there is a request and the request is of data service, the USB Master processor read the data in the Data Storage according to the starting address and length information of the requested data in the request; and then the data is transferred to the USB Slave processor via the USB cable; at last, the USB Slave processor processes the data and transfers it to the Data Consumer to consume for use.

In the method above mentioned, before the USB Master processor enquires of the USB Slave processor whether there is any request, there should be a USB initialization both of the USB Master device and the Slave device. After the initialization, the USB Master processor starts to search for potential USB Slave devices. If a potential USB Slave device is found, mutual USB Enumeration would be carried out between the potential USB Slave device and the USB Master device. If the USB Enumeration hits, the potential USB Slave device is confirmed as a USB Slave device. And a communication relation according to the USB Specification is set up between them. The USB Master processor checks the USB Slave device where a communication has been established. If there is not a characteristic identifier in the USB Slave device needed for configuration, the USB Master processor returns to the state of searching for potential Slave devices continually. If there is a characteristic identifier in the USB Slave device which is needed for configuration, the USB Master processor starts to enquire of the Slave device at a regular interval whether there is any request of service to the USB Master processor.

In the method above mentioned, after the USB Master processor has received the request from the USB Slave processor, the USB Master processor starts to judge whether the request is of data service. If it isn't a request of data service, the USB Master processor starts to read the status information of Data Storage. And then the USB Master processor sends the status information to the USB Slave device via the USB cable. And the status information is put into the buffer of the USB Slave processor.

The advantages of this invention are as follows:
(1) The present invention of data transmission and control system based on USB achieves that data in the Data Storage is read by the USB Master processor before it is transferred to the Slave device via USB cable and then the said data is transferred to the Data Consumer after it is processed by the USB Slave processor. So the USB system is a new data transmission means and it's an original invention-creation.
(2) Comparing to the conventional USB system which can only transmit data from USB Slave device to USB Master device, the system of the present invention is a USB system having its own feature. The present invention not only changes the mode of the conventional USB data transmission in structure, but also installs new software in USB Master device and USB Slave device, and so the transmission mode in which stored data can be transferred from the Data Storage of USB Master device (comprising hard driver, CDROM, DVDROM, static memories, and etc) to USB Slave device is achieved successfully.
(3) The present USB system could be used to car-mounted GPS (global positioning system). Car-mounted GPS mainly comprises GPS integrating machine of receiving and processing, and portable notebook computer, or PDA palmtop computer, or CARPC, etc. GPS receiver commonly called as G-MOUSE is to deal with the signal from satellites and then changes its form to standard format and transfers to a computer through a cable or a slot, and the interface mode adopted is generally RS232. Portable notebook computer, PDA palmtop computer, or CARPC car-mounted computer, etc deals with the signal of position, speed, height etc from the G-MOUSE, and then combines them with the electronic map, shows present position and other information. The present invention could set the DVD player with LCD as the USB Master device, and sets the USB Slave device of single function to compound pictures. The USB Slave device deals with the signal of position, speed, height etc from the G-MOUSE, and then combines them with the electronic map from DVD player, shows the outcome of compound pictures on the DVD player's LCD. Even more, the DVD player and the Slave device used for compounding pictures could be made together to form an integrating machine. So the car-mounted GPS with the present invention is high speed and low cost.

DETAILED DESCRIPTION OF THE INVENTION

Figure 1:
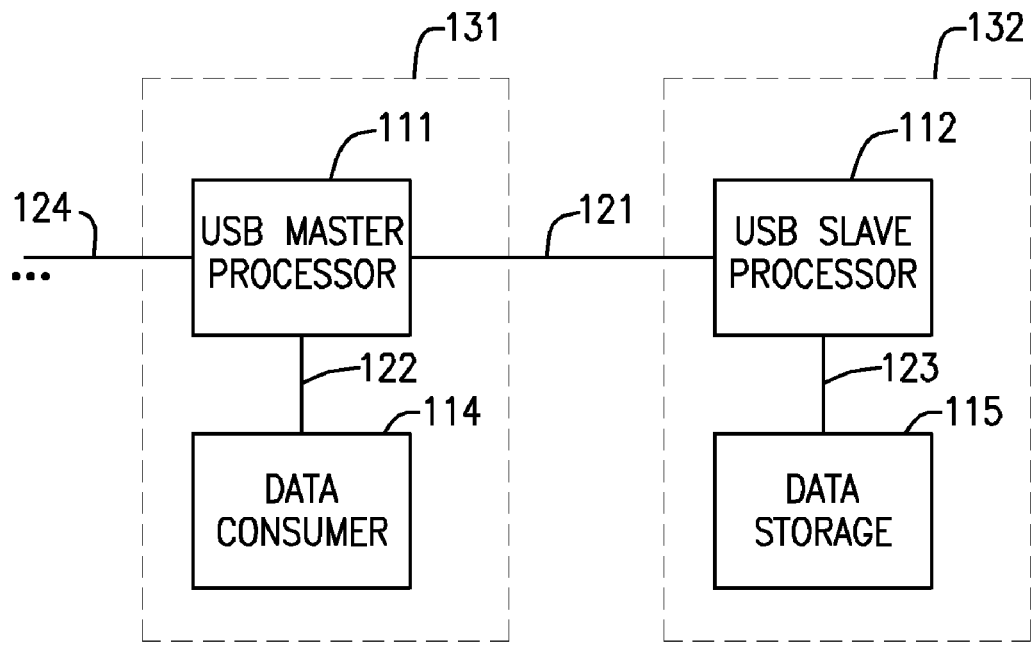
FIG. 1 is a frame diagram of a conventional USB system.
Figure 2:
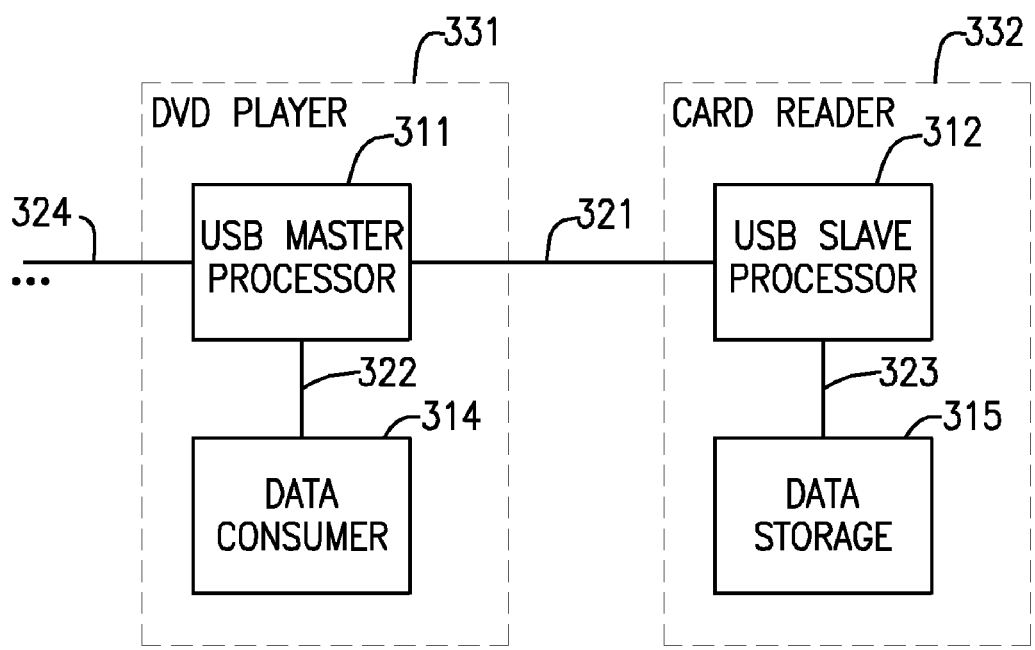
FIG. 2 is a frame diagram of an application device of another conventional USB system, in which the USB Master device is a DVD player and the USB Slave device is a card reader.
Figure 3:
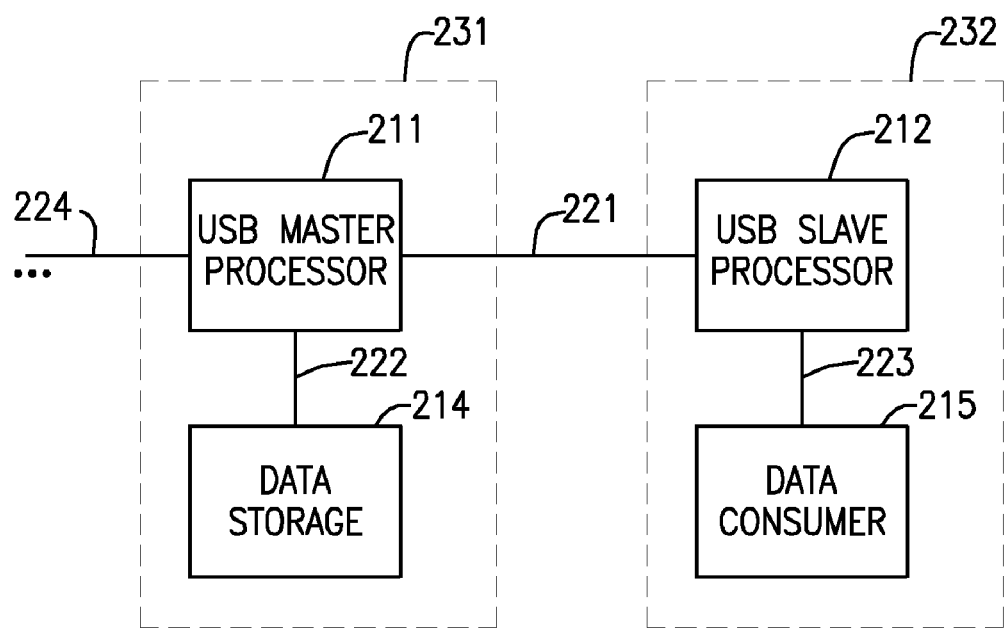
FIG. 3 is a frame diagram of a data transmission system based on a USB system in accordance to the present invention.

Referring to FIG. 3, the data transmission and control system of the present invention based on USB comprises a USB Master device 231 and a USB Slave device 232. USB Master device 231 is equipped with a USB Master processor 211 and a Data Storage 214 connecting to USB Master processor 211. USB Slave device 232 is equipped with a USB Slave processor 212 and a Data Consumer 215 connecting to USB Slave processor 212. USB Master processor 211 is coupled with USB Slave processor 212 via a USB cable 221. USB Master processor 211 can be coupled with other Slave devices via USB cable 224.

Figure 4:
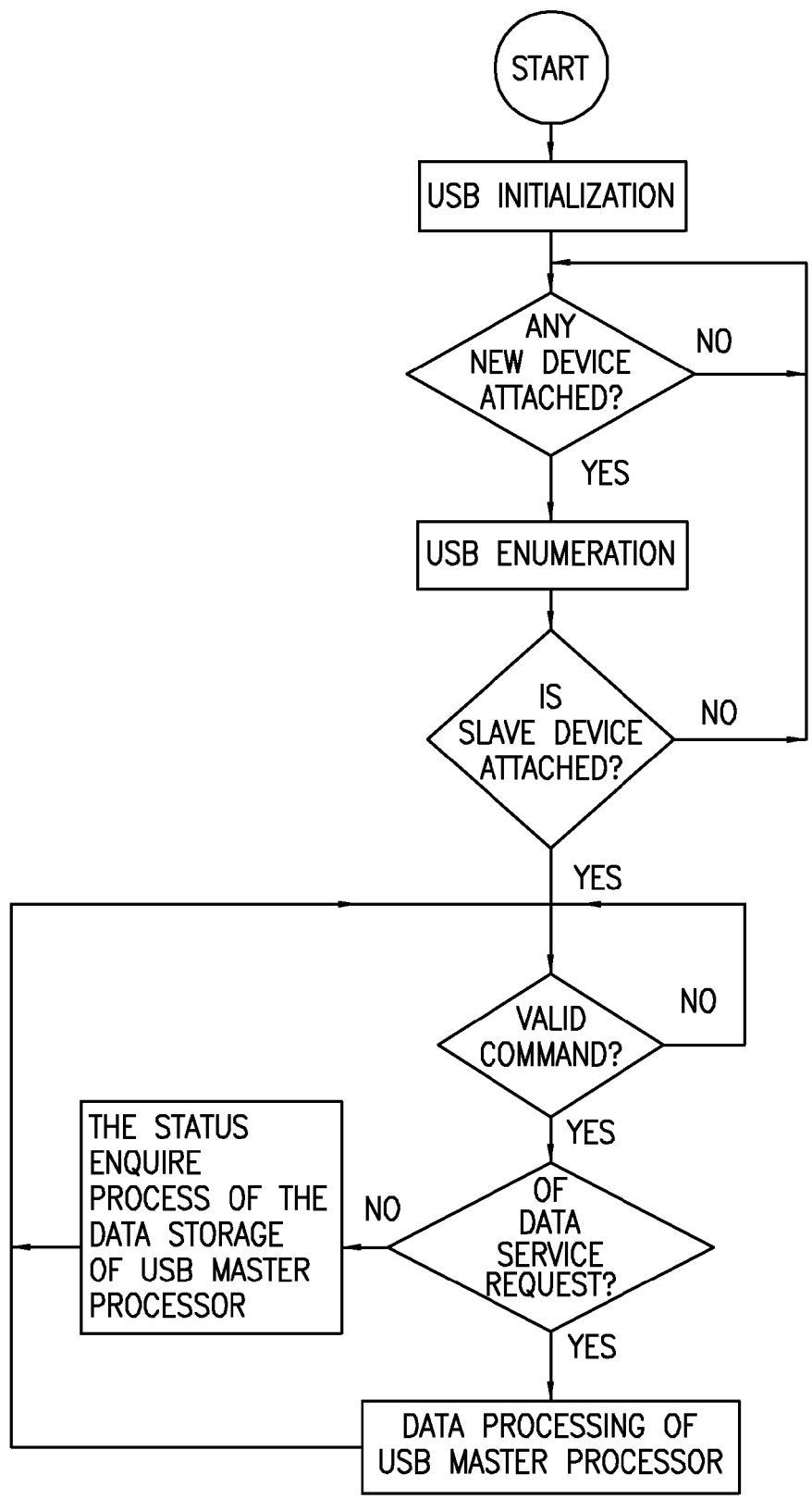
FIG. 4 is the work flowchart for the USB Master processor in the FIG. 3.

Referring to FIG. 4, when the system is started, both of USB Master device 231 and USB Slave device 232 begin to be initialized.

After the initialization, USB Master processor 211 begins to detect potential Slave device devices. After having found some potential Slave device, USB Master processor 211 make a mutual enumeration with it. If the enumeration is successful, the potential Slave device is identified as a Slave device and the communication relation in accordance with USB specification between them is established.

The procedure of the enumeration comprises: USB Master processor 211 detects the existence USB Slave processor 212 and assigns it a unique USB address and makes it addressed. The address is marked in the address register (ADDR) to ensure that the data will not be sent to other USB peripheral devices.

Meanwhile, a message channel called "ENDPOINT 0" is firstly established between USB Master device 231 and USB Slave device 232 in the protocol layer, and then USB Master processor 231 starts to read the device configuration tag word in the ROM of the Slave device 232 via the channel END-POINT 0.

(1) Based on the device configuration tag word, USB Master processor 231 assigns a configuration value to USB Slave device 232, and then USB Slave device 232 becomes configured, All of its endpoints are in the status as the configuration value describes. The USB Enumeration concludes.

Figure 5:
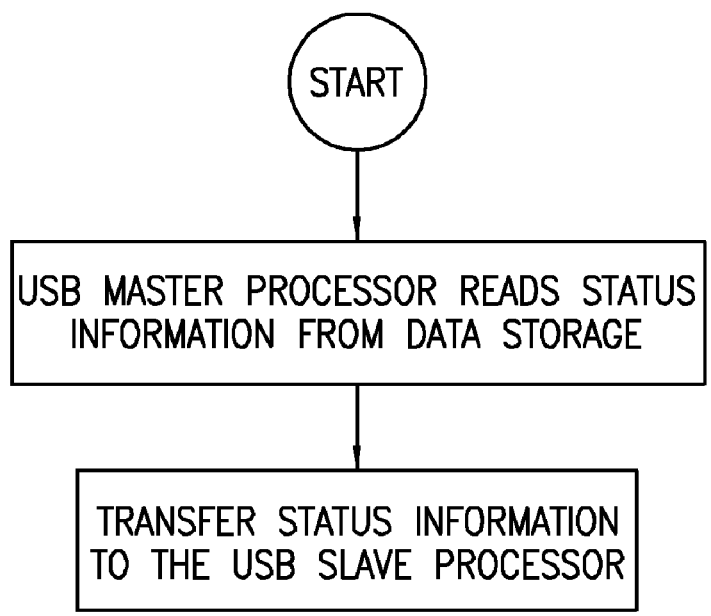
FIG. 5 is the sub-flowchart for the status enquiry process of the Data Storage of USB Master processor in FIG. 4.
Figure 6:
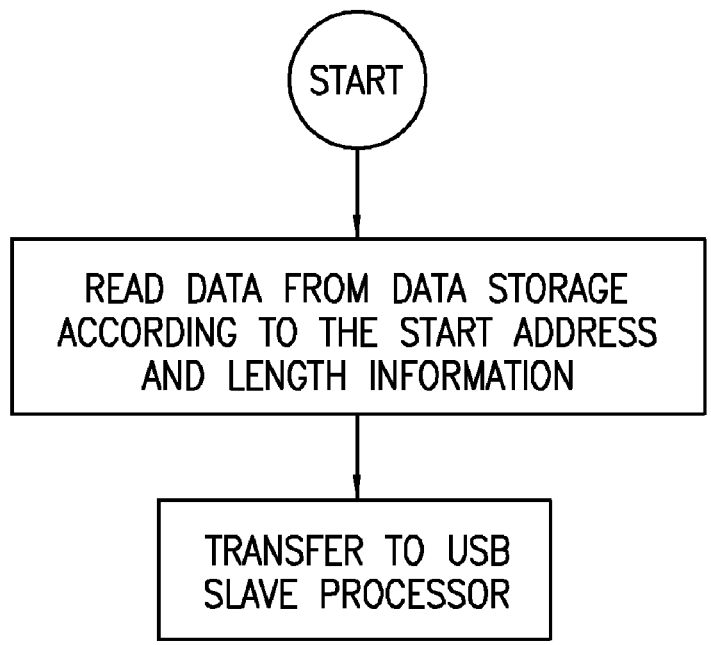
FIG. 6 is the sub-flowchart for data processing in FIG. 4.

After that, USB Master processor 211 checks the USB Slave device with which USB Master processor 211 has established a USB communication in such a way: if the USB Slave device has not a characteristic identifier which is needed for configuration, USB Master processor 211 will return to the status of searching potential Slave device devices, while if the Slave device has a characteristic identifier tag word which is needed for configuration, USB Master processor 211 will inquire of USB Slave processor 212 at regular intervals whether or not USB Slave processor 212 has sent a service request. When USB Master processor 211 receives the service request from USB Slave processor 212, it judges whether or not this request is of data service. If not, then USB Master processor 211 reads the status information from Data Storage 214 and transfers the status information to USB Slave processor 212 via USB cable 221 and stores it into the buffer in USB Slave processor 212, as shown in FIG. 5. If yes, as shown in FIG. 6, USB Master processor 211 will read the corresponding data information from Data Storage 214 according to the start address and length information involved in the request, and then transfer it to USB Slave processor 212 via USB cable 221.

Figure 7:
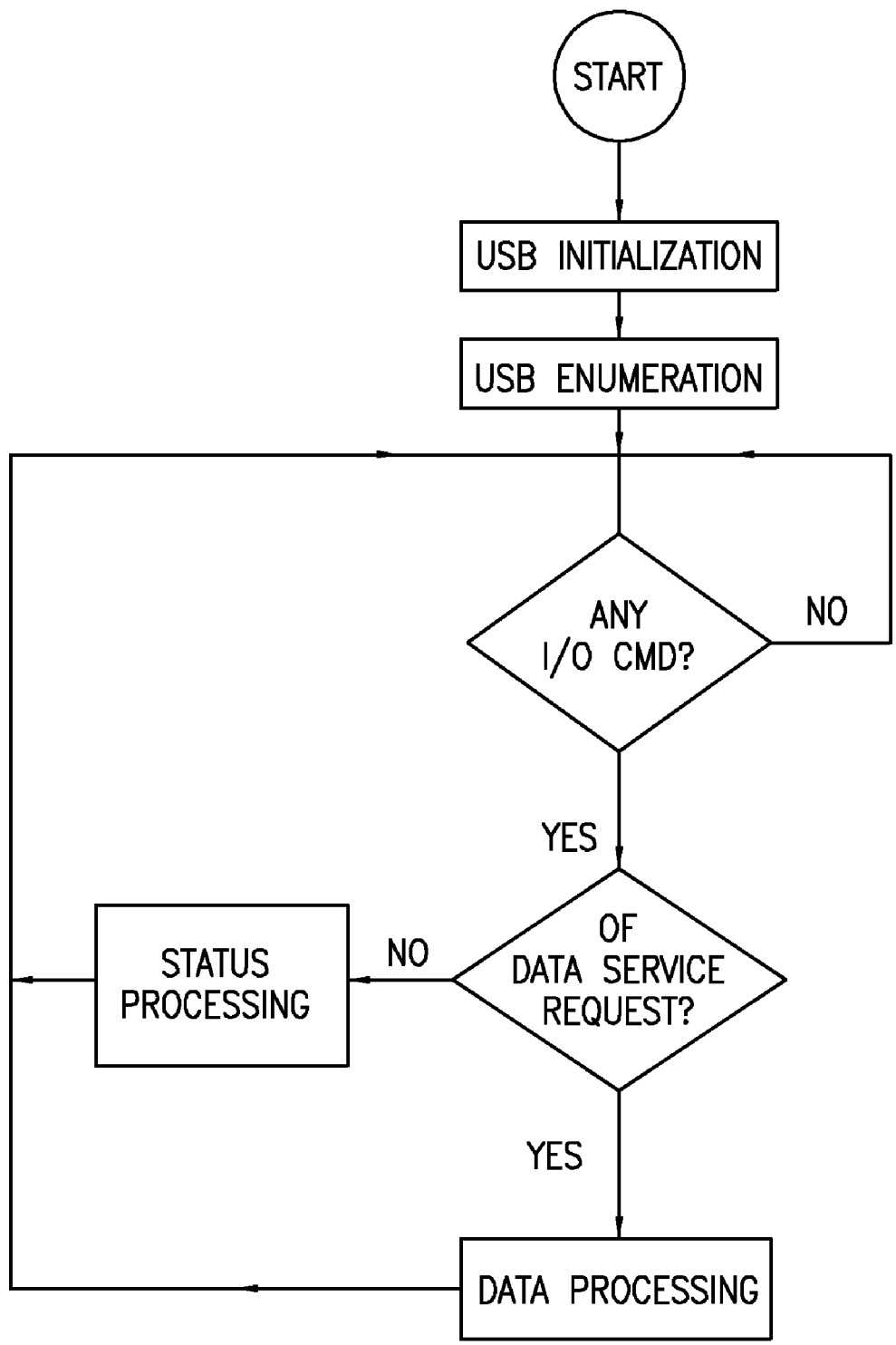
FIG. 7 is the work flowchart for the USB Slave device.

Referring to FIG. 7, after the mutual enumeration between USB Master device 231 and USB Slave device 232, a communication specification (such as transmission protocol, channel numbers, data transmission mode and states of both sides, etc) is established between them, which makes USB Slave device 232 in a service status as a result. After that, USB Slave processor 212 is waiting for the I/O (input/output) command from input devices of USB Slave device 232. This I/O command can also be made by USB Slave processor 212 when other application programs are running.

If there's no I/O command, USB Slave processor 212 will keep waiting. If there is an I/O command, the USB Slave processor 212 will judge whether or not the command is for data service request command.

If this request command is not a data service request command, USB Slave processor 212 will mark this command as a status request and put it into the first register as a service request on the one hand, put the information concerning that this command is a drive status request into a second register on the other hand. USB Master processor 211 enquires USB Slave processor 212 at regular intervals for whether it makes a service request to USB Master processor 211. When USB Master processor 211 reads a request command in the first register of USB Slave processor 212 and judges it is not for a data service request command, the status information of Data Storage 214 will be read and transferred via USB cable 221 to USB Slave processor 212 which then stores the information into corresponding section in the buffer of USB Slave processor 212 according to the tag in the second register. If this request command is a data service request command (this command comprises the start addresses and length information in Data Storage 214 concerning data needed because it is produced by USB Slave processor 212 according to the status information in the Data Storage 214 and other running application programs), USB Slave processor 212 will mark this command as a data service request and put it into the first register as a service request on the one hand, put the information concerning that this command is a data service request into a second register on the other hand. The USB host 211 enquires the USB Slave processor 212 at regular intervals for whether it makes a service query to USB Master processor 211. When USB host 211 reads a data service request command in the first register of USB Slave processor 212 and judges it is a data service request command, the data information according to the corresponding address in Data Storage 214 will be read and transferred via USB cable 221 to USB Slave processor 212 which then stores the information into corresponding section in the buffer of USB Slave processor 212 according to the tag in the second register. And then USB Slave processor 212 will verify and rearrange the data and carry out other processing, then transmit them to Data Consumer 215 for use.

The invention claimed is:

1. A system for data transmission and control based on Universal Serial Bus (USB) comprising:
    a USB Master device (231) includes a DVD player with an LCD display, and a USB Slave device (232) includes a car-mounted GPS, said USB Master device (231) comprising a USB Master processor (211), said USB Slave device (232) comprising a USB Slave processor (212), said USB Master processor (211) coupled with said USB Slave processor (212) via a USB cable (221);
    said USB Master device (231) further comprising a Data Storage (214) connected to said USB Master processor (211), and a Data Consumer (215) connected to said USB Slave processor (212) in said Slave device (232); and
    a communication connection between said USB Master processor (211) and said USB Slave processor (212) via which said USB Slave processor (212) receives data to be processed through said USB Master processor (211) from said Data Storage (214) of said USB Master device (231).

2. The system of claim 1 wherein the car-mounted GPS comprises a GPS integrating machine for receiving and processing and a computing device, which is one of: (i) a portable computer, (ii) a PDA, (iii) a palmtop computer, and (iv) a CARPC; the GPS integrating machine changing a signal from satellites to a standard format and transferring it to the computing device; the computing device dealing with signals related to position, speed, and height from the GPS integrating machine and then combining them with an electronic map from the DVD player, the result of the combination being displayed on the LCD display.

3. A method for data transmission and control based on Universal Serial Bus (USB), for use in a system including a USB Master device (231) comprising a USB Master processor(211) and a Data Storage (214) connected to the USB Master processor(211), and a Slave device (232) comprising a USB Slave processor (212) and a USB Consumer (215) connected to said USB Slave processor (212), the USB Master processor (211) coupled with said USB Slave processor (212) via a USB cable (221), the method comprising the following steps:

the USB Master processor (211) enquires of said USB Slave processor (212) whether there is a request;

if there is a request and the request is for data service, said USB Master processor (211) reads corresponding data in said Data Storage (214) according to the starting address and length information of the requested data in the request;

transferring to said USB Slave processor (212) via said USB cable (221); and after having been processed by said USB Slave processor (212), transferring the data said USB Consumer (215) of said USB Slave processor for use.

4. The method of claim 3, wherein both of the USB Master device (231) and of the Slave device (232) are initialized before the USB Master processor (211) enquires of the USB Slave processor (212) whether there is a request;

after the initialization, said USB Master processor (211) starts to search for potential Slave devices;

if a potential Slave device is found, a mutual USB Enumeration is carried out between said potential Slave device and said USB Master processor (211);

if said USB Enumeration hits, said potential Slave device is confirmed as a Slave device and a communication is set up between them; then said USB Master processor (211) checks said Slave device;

if there is not a characteristic identifier in said USB Slave device which is needed for configuration, said USB Master processor (211) returns to the state of searching for other potential Slave devices continually;

if there is a characteristic identifier in said USB Slave device, said USB Master processor (211) starts to enquire of said USB Slave processor (212) at a regular interval whether there is any request of service.

5. The method of claim 3, wherein after said USB Master processor (211) finds a request from said USB Slave processor (212), said USB Master processor (211) checks whether the request is for data service; if the request is not for data service, said USB Master processor (211) reads the status information of said Data Storage (214); and then said USB Master processor (211) sends the information to said USB Slave processor (212) via said USB cable (221); and then the information is saved into a buffer of said USB Slave processor (212).

6. The method of claim 4 wherein the wherein the USB Master device includes a DYD player with an LCD display, and the USB Slave device (232) includes a car-mounted GPS.

7. The method of claim 6 wherein the car-mounted GPS comprises a GPS integrating machine for receiving and processing and a computing device, which is one of: (i) a portable computer, (ii) a PDA, (iii) a palmtop computer, and (iv) a CARPC; the GPS integrating machine changing a signal from satellites to a standard format and transferring it to the computing device; the computing device dealing with signals related to position, speed, and height from the GPS integrating machine and then combining them with an electronic map from the DVD player, the result of the combination being displayed on the LCD display.

\* \* \* \* \*